April 6, 1954 J. W. BEAM 2,674,128
LIQUID LEVEL GAUGE
Filed May 4, 1950 2 Sheets-Sheet 1
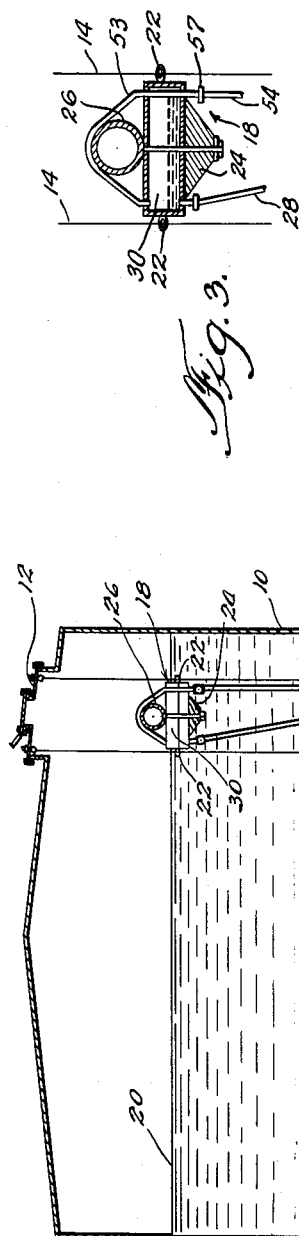
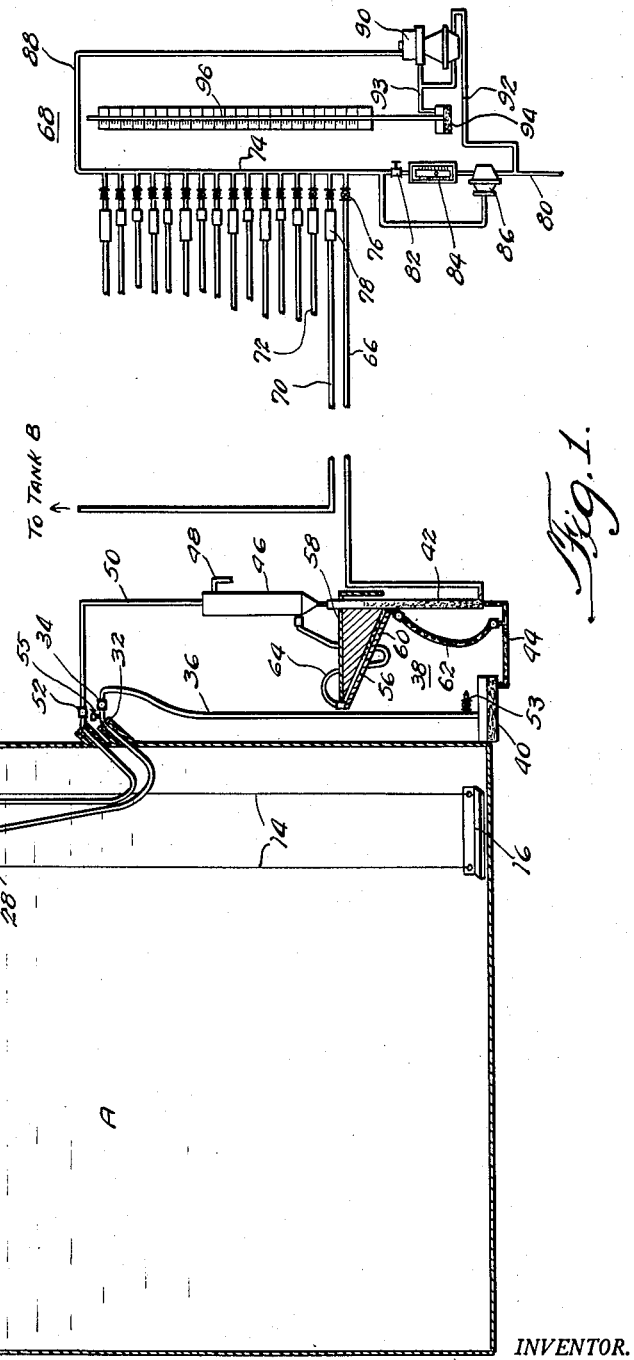
INVENTOR.
Jon W. Beam.
BY Thiess, Olson & Mecklenburger
Petty April 6, 1954   J. W. BEAM   2,674,128
LIQUID LEVEL GAUGE
Filed May 4, 1950   2 Sheets-Sheet 2
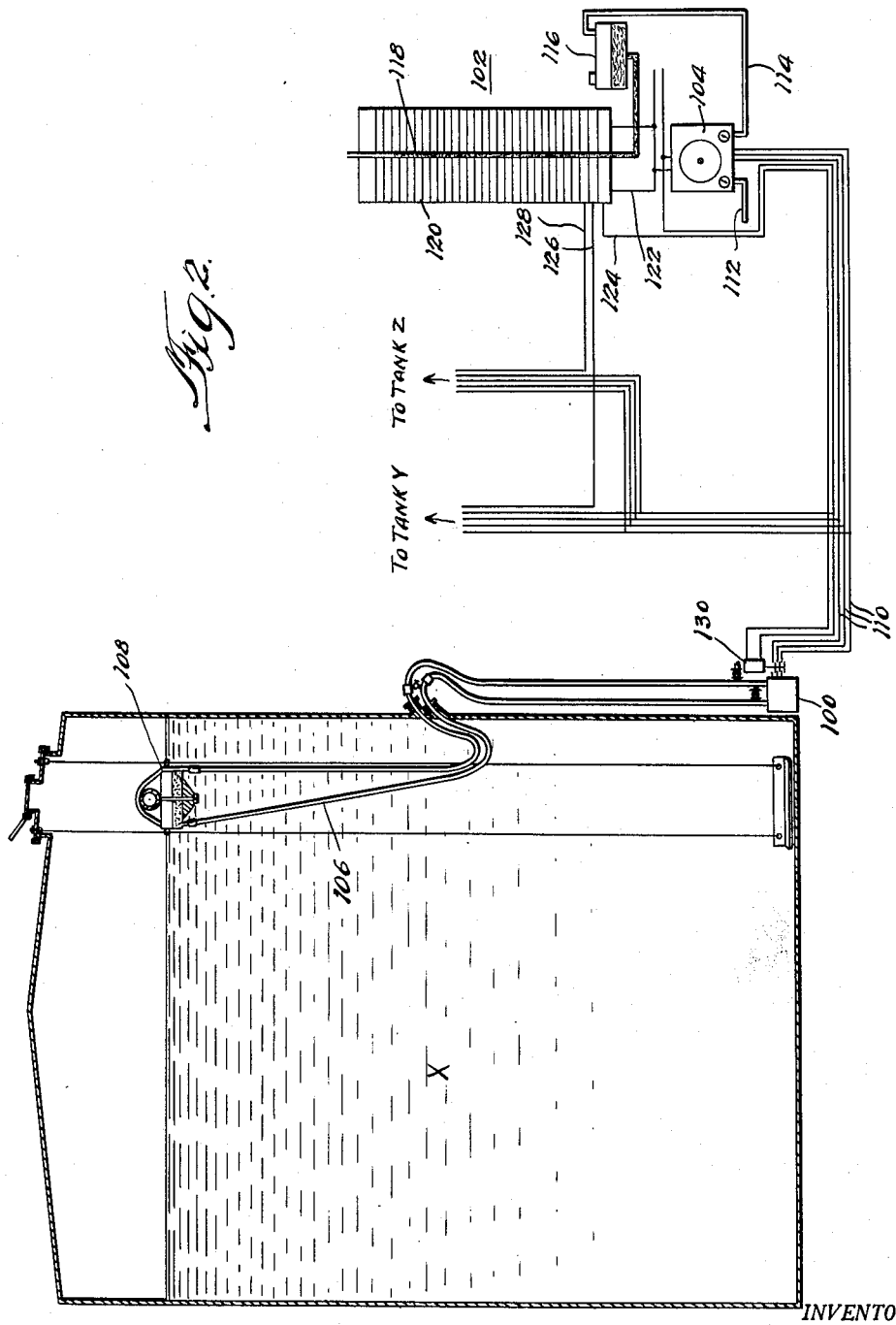
INVENTOR.
Jon W. Beam.
BY Thiess, Olsa + Mecklenburger.
Attys.

Patented Apr. 6, 1954

2,674,128

UNITED STATES PATENT OFFICE 2,674,128

LIQUID LEVEL GAUGE

Jon W. Beam, Cushing, Okla., assignor to Deep Rock Oil Corporation, Tulsa, Okla., a corporation of Delaware Application May 4, 1950, Serial No. 160,057

20 Claims. (Cl. 73—305)

This invention relates to gauging and more particularly this invention relates to a tank gauging system which finds particular usefulness in the gauging of tanks containing liquid petroleum products.

In order accurately to gauge a tank containing liquid petroleum products, it is important that the gauge reading not be affected by changes in the specific gravity of the petroleum liquid being gauged. Such a change in specific gravity may be either due to temperature change or to a change in composition of the liquid. Also the continuous gauging of tanks at an oil refinery is an expensive process since it is required that personnel make frequent trips to the tanks being gauged in order that frequent and accurate readings may be obtained.

Accordingly it is one object of this invention to provide a system for gauging tanks which is extremely accurate and which is not affected by changes in the specific gravity of the liquid being gauged.

A further object of this invention is the provision of a system for accurately gauging tanks at a centrally located gauging station which may be remote from the individual tanks.

A further object of this invention is the provision of a tank gauging system which may be readily installed in existing facilities without the necessity of subjecting each tank to a thorough cleaning operation prior to the assembly of the gauging elements therein.

A still further object of this invention is to provide a remote tank gauging system in which only one receiving instrument is required for all of the gauge-actuating devices associated with each tank.

A still further object of this invention is the provision of a gauge for an oil tank which is free from cables, pulleys, tapes, rotary shafts, seals or other moving parts which may be subjected to corrosion in the vapor space within the tank.

A still further object of this invention is the provision of a gauge means which may be employed within a closed tank and which is independent of any pressures that may develop therein.

Further and additional objects will appear from the following description, the accompanying drawings and the appended claims.

In accordance with one embodiment of this invention, a tank gauging system is provided which includes a tank and a pressure responsive device located adjacent the tank and normally exteriorly thereof. Within the tank there is suspended a float movable in a vertical direction with the liquid level within the tank. The float is hollow, providing a sealing fluid chamber. This chamber communicates by means of a flexible tubing with a fitting located adjacent the side wall of the tank at a point about midway between the maximum and minimum levels of oil within the tank. The flexible tubing or conduit communicates through said fitting and a rigid conduit with a pressure responsive device which may comprise a mercury manometer having a pressure chamber and a range tube. A sealing fluid having a very low coefficient of expansion is contained within the sealing fluid chamber of the float, the flexible conduit, the rigid conduit and the pressure chamber of the manometer above the level of mercury or other high density fluid contained therein.

In accordance with a preferred embodiment of this invention, the tank is gauged by passing a gas at a constant rate through a conduit from a remote gauging station to the range tube of the manometer wherein it is introduced under the surface of the mercury in the range tube. The back pressure of the gas in the conduit is measured at the gauging station and reflects the height of the mercury in the range tube which in turn reflects the height of the liquid level within the particular tank being gauged. It is preferred to have a single gauge at the gauge station and this gauge may be selectively connected by means of suitable valves mounted on a suitable control panel to any one of a number of gas conduits extending to corresponding tanks remote from the gauge station.

In accordance with another embodiment of this invention, an electrical means may be provided for electrically reflecting the pressure on a pressure responsive device adjacent the tank to the gauge at the centrally located gauging station. In this instance a plurality of switches on a control panel are provided for selecting the particular tank that is to be gauged at any one time and a single differential pressure receiver may be employed for receiving energy transmitted by each pressure responsive device at each tank.

For a more complete understanding of this invention, reference will now be made to the accompanying drawings, wherein Fig. 1 is a schematic view taken partially in section of a tank gauge and system constructed in accordance with one embodiment of this invention wherein pneumatic means are employed for reflecting variations in the liquid level of the tank back to a centrally located gauging station.

Fig. 2 is similar to Fig. 1, showing a modification in which electrical means are employed for energizing a centrally located gauging instrument in response to the height of the liquid level in each tank.

Fig. 3 is an enlarged view in section of the float mechanism of Figs. 1 and 2.

Referring now more particularly to Fig. 1, the system comprises a plurality of tanks 10, only one of which is shown in the drawing. The tanks are of the usual type employed in oil refineries and they range from 15 to 30 feet in height. Each tank is provided with a manhole cover 12 from which is suspended a pair of Monel metal wires 14 held taught by an angle iron weight 16 suspended near the bottom of the tank. A float member 18 is positioned in the tank for vertical movement with the level 20 of the fluid contained therein. The float is hollow, providing an enlarged sealing fluid chamber 30 which is somewhat elss than half full of a sealing fluid, as illustrated in the enlarged sectional view of Fig. 3, which is stable under ordinary atmospheric conditions.

The sealing fluid is preferably one which will not freeze under the usual atmospheric conditions and which has a low coefficient of expansion. Dibutyl phthalate or 50-50 mixture of ethylene glycol and water have been found to be satisfactory for the purpose. The float 18 has a relatively large horizontal dimension as compared with its height so that there is very little change in immersion of the float with gravity change of the liquid in the tank. Also the sealing fluid chamber in the float is enlarged in its horizontal dimension so that there will be no detectable change in level of sealing fluid in the float when some of the fluid displaces the mercury in the fluid pressure responsive device to be described hereinafter.

The sides of the float 18 are provided with a pair of eyebolts 22 through which the spaced wires 14 extend, thereby providing a track for the vertical movement of the float within the tank. The float 18 is provided with a stabilizing weight 24 secured thereto by means of an eyebolt 26 extending through the float.

A flexible tubing 28 formed from polyethylene or some other oil-resistant plastic material communicates between a lower portion of the sealing chamber 30 through a packing gland 32 in the side of the tank to a fitting 34. A rigid conduit 36 communicates with the flexible conduit 28 through the fitting 34 and extends to a pressure responsive device or mercury manometer 38 comprising a pressure chamber 40, a range tube 42 and a connecting conduit 44. The chamber 40, the range tube 42 and the connecting conduit 44 contain mercury or other high specific gravity fluid which is substantially nonvolatile and immiscible with the sealing fluid, as will be apparent to one skilled in the art. The upper portion of the chamber 40 above the level of the mercury is also filled with the sealing fluid whereby to provide a continuous column of sealing fluid through the conduits 36 and 28 to within the sealing fluid chamber 30 of the float.

The upper portion of the range tube 42 communicates with a trap 46 provided with a vent 48. A rigid conduit 50 communicates with an upper portion of the trap 46 and with a fitting 52 which in turn communicates with flexible tubing 54, the latter passing into the tank and communicating with an upper portion of the sealing fluid chamber 30 of the float 18. Thus the flexible conduit 54 provides means for venting the chamber above the liquid of the sealing fluid to the atmosphere to prevent any false readings that may otherwise be obtained in the device. That end of conduit 54 adjacent the float may be formed of metal tubing 53 which connects with the flexible tubing through a suitable fitting 57 beneath the float. The metal tubing 53 may extend upwardly through chamber 30 and over the eyebolt 26 to which it is welded.

The flexible tubings 28 and 54 extend through the side walls of the tank 10 at a point about midway between the full and empty positions of the float 18 within the tank. Thus minimum lengths of tubing are required for gauging throughout the entire range and there is afforded substantially no opportunity for slack tubing to become fouled up on any interior structural members or braces (not shown) within the tank.

Conduit 36 is provided with a valved inlet conduit 53 for introducing sealing fluid into the float-manometer system prior to operations. A valved venting conduit 55, normally closed, is also provided adjacent the fitting 34 to vent any air that may be trapped within the conduits 28 or 36 during or after introduction of the sealing fluid.

It will be apparent from the foregoing description that any changes in the level 20 of the liquid within the tank 10 will permit the float 30 to move, thus varying the static head of the sealing fluid contained in the continuous column confined by the float chamber 30, the flexible conduit 28, the rigid conduit 36, and the upper portion of the manometer chamber 40. The static head of the sealing fluid on the surface of the mercury in the chamber 40 will be accurately reflected by the height of the mercury in the range tube 42. Thus when the float 18 is at the bottom of the tank 10 there will be little or no static head of sealing fluid and the mercury level in the range tube 42 will be adjacent the lower end thereof. Inasmuch as the pressure of the sealing fluid exerted on the manometer 38 is dependent upon the static head of the sealing fluid, it will be noted that change in gravity of the contents of the tank 10 will have no effect on the height of the mercury within the range tube 42. In order further to compensate for any minor errors that may occur, it is desirable under certain circumstances to have the cross-sectional area of the sealing fluid chamber 30 of substantially the same size as the cross-sectional area of the mercury chamber 40 in manometer 38. If this is done, the static head of the sealing fluid will remain constant even though the mercury level does change somewhat in the high pressure chamber 40 of the manometer depending upon the position of the float in the tank.

It will be noted that the range tube 42 may be constructed in the form of a sight glass as indicated in Fig. 1. However, because of its comparatively short length and because of the fact that a gas may be bubbling therethrough in a manner hereinafter to be described, it is difficult to obtain accurate readings on this sight glass. In order to obviate this difficulty, there has been provided a supplemental sight glass 56 extending upwardly in an inclined direction on the under side of a vertically adjustable rack 58. Underneath the sight glass 56 is provided a suitably graduated strip 60. The sight glass 56 is connected at its lower end to conduit 44 by means of a piece of flexible tubing 62 and is connected at its upper end to the trap 46 by means of a piece of flexible tubing 64. Thus it will be seen that the sight glass 56 and the tubing 62 constitute somewhat of a supplemental gauge or range tube and the level of mercury within the sight glass will always be the same as the level of mercury within the range tube 42. This being the case and due to the fact that the sight glass 56 is positioned along an inclined graduate scale, it will be possible to make more accurate readings on the sight glass than it will upon the vertical range tube. In the particular device shown in Fig. 1 (assuming a 30 foot tank), the sight glass 56 extends only over a range corresponding to about one-third of the height of the range tube 42 and the range tube 42 has been graduated at two points denoting 10 foot and 20 foot levels respectively for the liquid in the tank being gauged. Thus when it is desired to employ the supplemental sight glass 56, the rack 58 is positioned so that the bottom of the sight glass coincides with the bottom of the range tube 42 or with the first or second graduation on the range tube. If positioned at the bottom and if the mercury level appears in the sight glass 56, then the reading in the supplemental sight glass gives the level in the tank. However, if the rack is positioned at the first graduation to get the mercury level to appear in the sight glass 56, then the reading on the sight glass plus 10 feet is the correct level of fluid within the tank. Similarly, if the rack 58 is positioned adjacent the second marking to get the mercury level to appear in the sight glass and as shown in the drawing, then the reading on the sight glass plus 20 feet is the correct reading of the liquid level within the tank 10.

In order to provide means for remotely gauging the tank as thus far described at a centrally located gauging station, there is provided a pneumatic conduit 66 extending from a gauging station 68 to the manometer 38 and opening into a bottom portion of the range tube 42. Similarly pneumatic conduits 70, 72 and others extend from the central gauging station 68 to other tanks (not shown) in the system. Each of the conduits 66, 70, 72, etc. terminate at the central gauging station in a manifold 74 and a supply of gas from the manifold to each of the conduits is controlled by individual valves or stop cocks 76. Also many of the conduits have fixed gas flow restrictive elements 78 positioned therein for a purpose to be more fully explained hereinafter.

At the gauging station 68 there is provided a conduit 80 for passing compressed gas such as air from a suitable source (not shown) into the manifold 74. A needle valve 82, an indicating rotometer 84 and a differential pressure regulator 86 are provided in the conduit 80 for insuring a constant rate of flow of air into the manifold 74. A conduit 88 communicates with the opposite end of the manifold 74 and extends to a pressure amplifying relay 90. The air relay 90 also communicates with the conduit 80 through a conduit 92 as well as with a pressure chamber 94 of a mercury manometer gauge 96. These amplifying air relays are well known in the art and will not be specifically described herein. Usually they comprise essentially air pilots which contain bellows or diaphragms of different effective areas connected by an adjustable linkage. The relays may be adjusted accurately to amplify, within limits, the pressure of the gas in conduit 88 to a correspondingly greater pressure in conduit 93. Thus the relay 90 may be adjusted to reflect in conduit 93 and on pressure chamber 94 a predetermined pressure which is from two to ten times greater than the back pressure exerted on the device through conduit 88.

The operation of the gauge system described in the foregoing is as follows: As previously indicated, the height of the level of the mercury or other high density fluid in the range tube 42 is dependent upon the level of the liquid in the tank 10. Thus when it is desired to measure the level 20 in the tank 10, a pet cock 76 in conduit 66 is opened to permit a constant flow of air through the conduit 66 from the manifold 74. The flow of air is controlled by the needle valve 82 and the differential pressure regulator 86 and indicated by the rotometer 84. The air or gas passing through conduit 66 escapes into a lower portion of the range tube 42 and bubbles up through the mercury contained therein. The mercury in the range tube creates a back pressure on the gas in the conduit 66 which is directly proportional to the height of the column of mercury in the range tube above the point of introduction of air thereinto. This back pressure is reflected back through the conduit 66, the manifold 74 and conduit 88 to the air amplifying relay 90. The pressure amplifying relay multiplies this back pressure from two to ten times as may be desired and this multiplied pressure is reflected on the gauge 96, thus giving an indication of the level 20 of the liquid in the tank 10.

Thus it will be apparent that by turning any one of the pet cocks 76 in the conduits 66, 70, 72, etc., a corresponding tank may be readily gauged at the central gauging station. The flow of gas into the manifold 74 should remain constant and the resistance to the flow of gas in all of the conduits 66, 70, 72, etc. from the manifold 74 to the corresponding range tube 42 must be substantially constant. In order to achieve this, the needle valve 82 and the air pressure amplifying relay 90 are adjusted so that the mercury in the gauge 96 reads zero when that tank connected to the central gauging station by the longest conduit is empty. The longest conduit will presumably be the one which offers the highest resistance to the flow of gas therethrough. When these adjustments have been made, then the other tanks when empty are successively and individually cut into the gauging system by opening valves 72 and flow restrictive elements 78 are placed in each of the successive lines so that the reading on the gauge 96 is also at a zero level when the corresponding tank is communicated with the manifold. Thereafter the device may be operated to give a true reading of the liquid level in any one of the tanks merely by opening that pet cock 76 which corresponds to the conduit communicating with the range tube of the pressure responsive device or manometer of the desired tank.

If desired, the pressure amplifying relay 90 may be eliminated from the system and the conduit 88 may communicate directly with the high pressure chamber 94 of the gauge 96. However, if this is done, the range of the scale in the gauge 96 may be so short that accurate readings are not obtainable. For this reason it is preferred to use the air amplifying relay 90 whereby the length of the gauge tube 96 may be increased to obtain readings of the level of liquid in the tanks to within a fraction of one inch.

It will be apparent from the foregoing description that a simple means has been devised for gauging a series of tanks remote from a central gauging station. This gauging may be effected by a single operator located at the station and almost any number of tanks can be readily gauged on the single gauge 96. Also each tank may be gauged at its own location if desired. In this modification of the device, no electrically operated devices are contemplated and accordingly the explosion hazard is thereby reduced.

However, a gauging system which utilizes electrically operated gauging means is contemplated within the broad scope of this present invention. In this connection reference is made to Fig. 2 in which a tank gauging system is shown employing a plurality of tanks to be gauged (only one tank being shown), each having associated therewith an electrically operated differential pressure-transmitting device 100 and a central gauging station 102 which includes a single differential pressure-receiving device 104. As will be apparent to one skilled in the art, the transmitter 100 of each tank is a pressure responsive device which measures the static head of a sealing fluid in a conduit 106 communicating with a float 108 in substantially the same manner as previously indicated. This pressure response is electrically transmitted through a plurality of wires 110 extending to the receiving device 104 at the central gauging station 102. In the device shown in Fig. 2 the receiving device 104 is of the pneumatic type which is supplied with gas under pressure through conduit 112 and which supplies a gas at a pressure through conduit 114 which depends upon the response of the instrument 104 to the electrical signal received from the transmitter 100. Conduit 114 communicates with a pressure chamber 116 of a mercury manometer having a gauge tube 118. Thus it will be understood that when the circuit between transmitter 100 and the receiver 104 is closed, the level of the liquid in the tank being connected will be reflected on the central gauge 118.

The pressure responsive transmitter 100 and the receiving device 104 may be any one of a number of electrical devices that are now available to the art. For example, they may be devices employing a self-balancing inductance bridge system (Brown Instrument Company) or be devices of the electrical resistance type (Republic Flow Meters Company) or electrical capacity measuring type (Foxboro Company). Generally speaking, the pressure-transmitting elements of these devices include a mercury manometer having a range tube. If a capacity measuring type device is employed, the condenser plates are immersed in a body of fluid having a known dielectric constant in the range tube of the manometer above the liquid level of the mercury therein. If desired, these instruments can also be of a type in which the differential pressure-transmitting device is a pressure-operated electric strain gauge and in which the receiving element includes a resistance thermometer.

In order selectively to gauge any one of a plurality of tanks at the central gauging station 102, a switch panel 120 is provided having a number of switching elements (not shown) which correspond to each of the tanks to be gauged. The panel is connected to one side of a source of electrical current through a line 122 and each of the switching elements is associated with this line and with individual lines 124, 126 and 128 extending respectively to gravity type solenoid switches 130 positioned adjacent the pressure differential-transmitting devices 100 adjacent each tank. All of the switches on the panel 120 are normally open and all of the gravity type solenoid switches 130 are also normally open. In this condition there is no registry on the gauge glass 118 at the central receiving station. However, when it is desired to gauge any one particular tank, the corresponding switch button on the panel 120 is pushed, thereby activating the corresponding solenoid switch 130 to close the circuit in lines 110 extending between the transmitting device 100 and the central receiving device 104. When this has been effected the gauge glass 118 will accurately reflect the level of liquid within the tank corresponding to the button pushed.

It will thus be apparent that an electrical means has been provided for accurately gauging a large number of tanks at a central gauging point. In case these electrical devices are employed, they should, of course, be explosion-proof.

In the devices shown and described, a mercury manometer is shown to be associated with the pressure-transmitting devices. However, it will be apparent to one skilled in the art that other types of manometers may be used in certain applications of the invention.

As previously indicated, the invention has particular applicability for gauging at a central station and by one receiving device a large number of tanks that contain petroleum products having various specific gravities. The system is extremely accurate since the gauge readings are dependent solely upon the height of the level of liquid within each tank and do not vary with changes of temperature or specific gravity of fluid within each tank. The gauge may be readily installed in existing tanks and no parts which would normally be susceptible to corrosion, such as gears, cables, pulleys, tapes, rotary shafts or seals are required within the tanks. An important feature of the hereindisclosed system is that the gauge readings are not affected by changes in vapor or gas pressures within the tank, as will be apparent from the foregoing description.

While particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A tank gauging system for gauging the level of a first liquid in a tank at a remote location which comprises a hollow float member within said tank containing a sealing fluid for vertical movement with the level of said liquid, a fluid pressure responsive device including two upwardly extending chambers communicating at their lower ends and containing a second liquid of high specific gravity immiscible with said sealing fluid, a conduit communicating between the interior of said float member and one of said upwardly extending chambers, said conduit being filled with sealing fluid to provide a continuous column thereof from the surface of said second liquid in said one chamber to said float member whereby variations in the liquid level within said tank are reflected in variations in the liquid level of the second liquid in the other of said upwardly extending chambers, a gauge remote from said tank and said fluid pressure responsive device, and energy-transmitting means extending between said gauge and said pressure responsive device for reflecting on said gauge the level of said second liquid in said other chamber.

2. A system for gauging the level of a first liquid in a tank at a remote location which comprises a hollow float member within said tank for vertical movement with the level of said liquid and containing a sealing fluid, a fluid pressure responsive device including two upwardly extending chambers communicating at their lower portions and containing a second liquid of high specific gravity immiscible with said sealing fluid, a conduit communicating between the interior of said float member and one of said upwardly extending chambers, said conduit being filled with sealing fluid to provide a continuous column thereof from the surface of said second liquid in said one chamber to said float member whereby variations in the liquid level within said tank are reflected in variations in the level of said second liquid in the other of said upwardly extending chambers, a second conduit for introducing a gas at a constant rate under the surface of said second liquid in said other chamber at a fixed point, and gauge means remote from said tank and said pressure responsive device for measuring the back pressure in said second conduit as determined by the liquid level in said other chamber.

3. A system for gauging the level of a first liquid in a tank at a remote location which comprises a hollow float member within said tank for vertical movement with the level of said liquid and containing a sealing fluid, a fluid pressure responsive device including two upwardly extending chambers communicating at their lower portions and containing a second liquid of high specific gravity immiscible with said sealing fluid, a conduit communicating between the interior of said float member and an upper portion of one of said upwardly extending chambers, said conduit having a flexible section to permit free vertical movement of said float and being filled with sealing fluid to provide a continuous column thereof from the surface of said second liquid in said one chamber to said float member whereby variations in the liquid level within said tank are reflected in variations in the level of the second liquid in the other of said upwardly extending chambers, a gauging station remote from said tank, a second conduit extending between said gauging station and said fluid pressure responsive device and terminating at a fixed point in said other chamber beneath the surface of the second liquid therein, means for introducing a gas at a constant rate into said second conduit for escape beneath the surface of the second liquid therein, means for venting an upper portion of said other chamber to the atmosphere, and gauge means at said gauging station operably connected with said conduit for measuring the back pressure in said conduit as determined by the liquid level in said other chamber.

4. The system recited in claim 3 wherein said other chamber is vented through a liquid trap secured to an upper portion thereof.

5. The system recited in claim 3 wherein the horizontal cross-sectional areas of both the interior of the hollow float member and said one chamber are substantially greater than that of said other chamber.

6. The system recited in claim 5 wherein the horizontal cross-sectional areas of the interior of the hollow float member and said one chamber are substantially the same.

7. A system for gauging the level of a first liquid in a tank at a remote location which comprises a hollow float member within said tank for vertical movement with the level of said liquid and containing a sealing liquid, a liquid pressure responsive device including two chambers communicating at their lower portions and containing a high specific gravity second liquid immiscible with said sealing liquid, a conduit communicating between the interior of said float member and an upper portion of one of said chambers, said conduit having a flexible section to permit free vertical movement of said float and being filled with said sealing liquid to provide a continuous column thereof from the surface of said second liquid in said one chamber to said float member whereby variations in the liquid level within said tank are reflected in variations in the level of the second liquid in the other of said chambers, a gauging station remote from said tank, a second conduit extending between said gauging station and said liquid pressure responsive device and opening thereinto at a point normally below the surface of the second liquid level in said other chamber, means at said gauging station for passing a gas at a constant rate through said second conduit into said other chamber for escape beneath the surface of said second liquid therein, vent means for said other chamber, and a pneumatically operated gauge means at said gauging station for measuring the back gas pressure in said conduit as determined by the liquid level in said other chamber.

8. A system for gauging liquid levels in a plurality of tanks, each containing a liquid to be gauged at locations remote from a central gauging station which comprises a chamber adjacent each tank containing a substantially nonvolatile liquid, means for varying the height of the liquid level in each of said chambers in response to the change of liquid level in the adjacent tank, a central gauging station, conduits communicating between said gauging station and each of said chambers, said conduits opening at their remote ends into said chambers at or below the normal liquid level therein and communicating with a common manifold at said central gauging station, valves in each of said conduits for selectively opening a passageway between said manifold and any one of said chambers, means for passing a gas at a constant rate into said manifold for discharge into the liquid of the chamber communicating with the selected conduit, and gauge means for registering back pressure of gas within said manifold as determined by the liquid level in that chamber communicating therewith through the selected conduit.

9. The system recited in claim 8 in which the gas flow resistance of each conduit is substantially the same.

10. The system recited in claim 9 in which at least some of said conduits include gas flow resisting elements.

11. A tank gauging system for determining the level of a liquid in a tank comprising a fluid pressure responsive device including a body of a high specific gravity liquid confined in two upwardly extending chambers communicating at their lower portions to form a continuous column of said high specific gravity liquid, a hollow float member defining a sealing liquid chamber within said tank for vertical movement with the level of liquid in said tank, a conduit communicating between a lower portion of said sealing liquid chamber and an upper portion of one of said upwardly extending chambers, a second continuous column of a sealing fluid immiscible with said high specific gravity fluid above the surface of said last mentioned fluid and extending through said conduit into said sealing liquid chamber whereby changes of liquid level in said tank are reflected in changes of liquid level in the other of said upwardly extending chambers, and means for gauging the last mentioned liquid level.

12. The system recited in claim 11 wherein said other upwardly extending chamber comprises a sight gauge glass.

13. The system recited in claim 11 wherein said last mentioned means comprises a pneumatically operated gauge at a point remote from said tank, a conduit for passing a gas under the surface of the liquid in said other chamber, and a conduit communicating between said conduit and said gauge for measuring back pressure of gas in response to the level of the liquid in said other chamber.

14. The system recited in claim 11 wherein said last mentioned means comprises an electrical differential pressure transmitter associated with said fluid pressure responsive device, an electrical differential pressure receiver at a point remote from said tank responsive to said transmitter, and a gauge for measuring the response of said receiver to said transmitter.

15. The system recited in claim 12 in which a supplemental sight gauge glass communicating with said first sight gauge glass is positioned adjacent thereto in an inclined position and in vertically adjustable relationship.

16. A tank gauging system for determining the level of a liquid to be gauged in a tank comprising a fluid pressure responsive device exteriorly of said tank responsive to the liquid level within said tank, a first conduit communicating with said device at one end and having another end terminating at a fixed position within said tank at a level substantially midway between the full and empty levels of said fluid in said tank, a hollow float member defining a sealing fluid chamber mounted within said tank for movement with the level of said fluid, guide means for confining said movement to a substantially vertical path, and a flexible conduit containing sealing fluid communicating between a lower portion of said chamber and said other end of said first conduit.

17. The system recited in claim 16 wherein the chamber within said float member has a substantially uniform cross section throughout the vertical distance of movement of the level of the sealing fluid therein.

18. A tank gauging system for determining the level of a liquid in a tank comprising a fluid pressure responsive device exteriorly of said tank responsive to the liquid level within said tank, a first conduit communicating with said device at one end and having another end terminating at a fixed position within said tank at a level substantially midway between the full and empty levels of said fluid in said tank, a hollow float member defining a sealing fluid chamber mounted within said tank for movement with the level of said fluid, a weight on a lower portion of said float member for maintaining it in an upright position, guide means in said tank cooperating with said float member for confining said movement to a substantially vertical path, and a flexible conduit containing a sealing fluid communicating between a lower portion of said chamber and said other end of said first conduit.

19. A system for gauging the level of a liquid in a tank at a location remote from a gauging station which comprises a chamber adjacent the tank containing a substantially non-volatile liquid, means for varying the height of the liquid level in said chamber in response to a change of liquid level in the adjacent tank, a gauging station, a conduit communicating between said gauging station and said chamber, said conduit opening at its remote end into said chamber at or below the normal liquid level therein and communicating with a manifold at said gauging station, a valve in said conduit for selectively opening a passageway between said manifold and said chamber, means for passing a gas at a constant rate into said manifold for discharge into the liquid of the chamber whenever said valve is open, and gauge means for registering back pressure of gas within said manifold as determined by the liquid level in the chamber communicating therewith through the conduit.

20. A system for gauging the level of a liquid in a tank at a location remote from a gauging station which comprises a chamber adjacent the tank containing a substantially non-volatile liquid, means for varying the height of the liquid level in said chamber in response to a change of liquid level in the adjacent tank, a gauging station, a conduit communicating between said gauging station and said chamber, said conduit opening at its remote end into said chamber at or below the normal liquid level therein, a valve in said conduit for selectively opening a passageway between said chamber and said gauging station, means for passing a gas at a constant rate into said conduit for discharge into said chamber whenever said valve is open, and gauge means for registering back pressure of gas within said gauging station as determined by the liquid level in the chamber communicating therewith through the conduit.

References Cited in the file of this patent

UNITED STATES PATENTS

| Number | Name | Date |
| --- | --- | --- |
| 723,040 | Schmitz | Mar. 17, 1903 |
| 771,447 | Tripp | Oct. 4, 1904 |
| 1,251,679 | Mason | Jan. 1, 1918 |
| 1,500,790 | Bacharach | July 8, 1924 |
| 1,731,377 | Hand | Oct. 15, 1929 |
| 2,009,630 | McNeill | July 30, 1935 |
| 2,426,930 | Hicks | Sept. 2, 1947 |
| 2,471,026 | Eby | May 24, 1949 |

FOREIGN PATENTS

| Number | Country | Date |
| --- | --- | --- |
| 249,825 | Great Britain | June 17, 1926 |